United States Patent [19]
Garcia

[11] Patent Number: 5,510,832
[45] Date of Patent: Apr. 23, 1996

[54] SYNTHESIZED STEREOSCOPIC IMAGING SYSTEM AND METHOD

[75] Inventor: Baxter J. Garcia, Ridgefield, Conn.

[73] Assignee: Medi-Vision Technologies, Inc., Key Biscayne, Fla.

[21] Appl. No.: 158,773

[22] Filed: Dec. 1, 1993

[51] Int. Cl.$^6$ .................................... H04N 13/82
[52] U.S. Cl. ................. 348/56; 348/51; 348/46; 348/42
[58] Field of Search ................. 348/51, 52, 53, 348/54, 55, 56, 57, 58, 44, 45, 43, 42

[56] References Cited

U.S. PATENT DOCUMENTS

| 4,807,024 | 2/1989 | McLaurin et al. | 358/88 |
|---|---|---|---|
| 4,819,255 | 4/1989 | Sato | 378/42 |
| 4,884,876 | 12/1989 | Lipton et al. | 350/347 |
| 4,943,852 | 7/1990 | Femano et al. | 348/49 |
| 4,979,033 | 12/1990 | Stephens | 348/56 |
| 5,007,715 | 4/1991 | Verhulst | 348/53 |
| 5,099,320 | 3/1992 | Allio | 348/56 |
| 5,142,642 | 8/1992 | Sudo | 348/54 |
| 5,193,000 | 4/1993 | Lipton et al. | 348/55 |
| 5,283,640 | 2/1994 | Tilton | 348/49 |

FOREIGN PATENT DOCUMENTS

| WO90/13848 | 11/1990 | WIPO . |
| WO92/03021 | 2/1992 | WIPO . |
| WO92/11735 | 7/1992 | WIPO . |

OTHER PUBLICATIONS

John A. Roese, "Stereoscopic Viewing with PLZT Ceramics," *Ferroelectrics*, 1976, vol. 10, pp. 47–51.
John A. Roese, Ph.D., et al., "Single Monitor Stereoradiological Television System Using PLZT Electroptic Sutters," Work In Progress, *Radiology*, vol. 121, pp. 743–744, Dec. 1976.
Majic S. Potsaid, M.D., "Medical Progress; Stereokineradiography I. Perception of Motion and Depth," *The New England Journal of Medicine*, Nov. 12, 1964, pp. 1048–1057.
Bob Metcalfe, "Look Ma, no glasses! 3–D Television Debuts," *InfoWorld*, Jun. 28, 1993, p. 62.
Amal Kumar Naj, "Virtual Reality Isn't a Fantasy For Surgeons," Science, *The Wall Street Journal*, Mar. 3, 1993, p. B1.

Primary Examiner—Tommy P. Chin
Assistant Examiner—Anand S. Rao
Attorney, Agent, or Firm—Wigman, Cohen, Leitner & Myers

[57] ABSTRACT

An observer is presented, through a pair of viewing glasses, a field/frame multiplexed, synthesized three-dimensional or stereoscopic image on single monitor generated from a two-dimensional monocular video signal. The field/frame multiplexed, synthesized 3D image is generated in a converter. A controller controls the left and right eye vision of the glasses along an unobstructed path without need of any connecting wires. A wide range of input sources can provide the 2D input video signal for conversion. The resulting synthesized 3D image is especially suited for medical and other purposes which require realistic, accurate and visually comfortable 3D visualization of video images, as for example in minimally-invasive surgery to allow complex navigational and manipulational procedures carried out over a continuous period of many hours. The ability to transform a 2D image from a single source into an accurately portrayed synthesized 3D image displayed on a color monitor is also necessary in related biomedical fields including microscopy, medical telecommunications and medical education.

28 Claims, 5 Drawing Sheets

| STEP | TIME | ACTIVITY DESCRIPTION |
|---|---|---|
| 1 | 1 | ACQUIRE FIRST FRAME F1; STORE IN STORAGE BUFFER. |
| 2 | 2 | COPY FRAME F1 TO COPY BUFFER. |
| 3 | 3 | ACQUIRE SECOND FRAME F2; STORE IN STORAGE BUFFER. |
| 4 | 4 | COPY FRAME F2 TO COPY BUFFER. |
| 5 | 5 | ACQUIRE THIRD FRAME F3; STORE IN STORAGE BUFFER. APPLY LEFT AND RIGHT SPATIAL OFFSETS TO FRAMES F1, F2 FOR DISPLAY. |
| 6 | 6 | COPY FRAME F3 TO COPY BUFFER. |
| 7 | 7 | ACQUIRE FOURTH FRAME F4; STORE IN STORAGE BUFFER. APPLY LEFT AND RIGHT SPATIAL OFFSETS TO FRAMES F2, F3 FOR DISPLAY. |
| 8 | 8 | COPY FRAME F4 TO COPY BUFFER. |
| 9 | 9 | ACQUIRE FIFTH FRAME F5; STORE IN STORAGE BUFFER. APPLY LEFT AND RIGHT SPATIAL OFFSETS TO FRAMES F3, F4 FOR DISPLAY. |
| 10 | 10 | COPY FRAME F5 TO COPY BUFFER. |
| 11 | 11 | ACQUIRE FIFTH FRAME F5; STORE IN STORAGE BUFFER. APPLY LEFT AND RIGHT SPATIAL OFFSETS TO FRAMES F4, F5 FOR DISPLAY. |

CODE: XY

X = BUFFER FULL (1), EMPTY (0)
Y = OFFSET POSITIVE (1), NEGATIVE (0)
* = INDETERMINATE (*)

SYNTHESIZED STEREOSCOPIC IMAGING SYSTEM AND METHOD

TECHNICAL FIELD

The present invention is directed to a system for synthesizing a three-dimensional image from a two-dimensional video image for many uses, including use in a medical setting, and more particularly for converting a two-dimensional video signal by means of digital processing into a realistic three-dimensional image. More specifically, the present invention is directed to visual presentation to medical personnel of an accurate three-dimensional image from a source such as a single camera. The invention is particularly useful where space needs dictate a single small camera, such as an endoscopic camera used in laparoscopic surgery.

BACKGROUND OF THE INVENTION

Realistic and highly accurate 3D video is useful in entertainment, business, industry, and research. Realistic and highly accurate 3D video is of special importance in the field of minimally invasive surgery (e.g., endoscopic and laparoscopic surgeries) since surgeons performing these procedures are guided entirely by the images that they view on a video monitor. Accuracy in industry, research, and medicine is required in order to carry out complex manipulations such as medical dissection and suturing procedures and in order to safely navigate within and among tissue and organ structures. Equally important, the 3D video imagery must be comfortable to view for long periods of time (8 hours in business, industry, and research, and up to 3-4 hours or even longer under great stress for some surgical procedures) without having the viewing system impart stress and eye strain. Further, it is especially desirable to enable viewing of 3D displays on one or several color monitors, which can be viewed by several people or at several positions in (or remote from) the office, factory floor, laboratory, or the operating theater. Also, it is advantageous to be able to transmit the 3D signal for distant viewing, such as would be required for teleconferencing, plant supervision, research collaboration, and for remote expert medical consultations or for live viewing by medical students.

Traditional stereoscopy has commonly employed a binocular system, e.g., two lenses, or two cameras, to produce the two channels of visual information; the critical factor that produces depth perception in these systems is the spatial parallax brought about by the spatial offset of the two input channels. "Parallax" refers to the difference in spatial orientation and perspective encountered when the same object or scene is viewed by two lenses (e.g., our eyes) which are spatially offset from one another. Many different embodiments of stereoscopic systems have been developed, including those that utilize twin-screen displays using "passive" polarized or differently colored viewing lenses in glasses worn by the viewer, field or frame-multiplexed systems which utilize a single display screen, head-mounted displays such as those commonly used in 'virtual reality' systems, where dual liquid-crystal screens or dual CRT's may be built into an assembly worn on the viewer's head, projection systems, and auto stereoscopic systems not requiring viewing glasses.

Attempts have also been made to develop systems which convert an input two-dimensional (2D) video signal into a form suitable for stereoscopic display. These have utilized various mechanical, electrical, and electro-optical devices and procedures which act to split the input image into two separate channels of visual information.

To date, the prior art methods and systems developed to produce stereoscopic three-dimensional (3D) video have not proved acceptable for entertainment, for many business, manufacturing, and research uses, and in the biomedical area. This situation is in contrast to stereoscopic display of computer-generated graphics, which has found commercial success, e.g., in the field of biochemistry where stereoscopic visualization of computer graphics images of complex molecular structures has become routine, typically utilizing software running on advanced workstation computers.

The reasons for the aforementioned lack of acceptance are manifold and include system complexity, expense, and physiological difficulties experienced by some viewers of these systems.

The key technical factor necessary to produce high-quality stereoscopic video, in systems that employ two lenses for input, is the maintenance of proper alignment of the two channels of image data. The external lenses or cameras of the known systems must be properly aligned and the signals must preserve that precise alignment relationship as they are processed by the system electronics or optics. Twin-screen viewing systems are known to be particularly prone to mis-alignment problems. Twin-screen systems also tend to be bulky and cumbersome. Single-screen solutions, such as the field/frame multiplexed method, minimize the problems associated with use of dual display monitors, yet still rely on accuracy of alignment of the input cameras.

One entertainment field implementation of multiplexed single-screen stereo video is the stereo video game systems marketed recently by the SEGA Corp. of Japan. These video game systems are based on use of a 60-Hertz display on conventional analog television monitors. Such systems are prone to serious flicker since each eye is receiving only 15 video frames per second. The flicker and jerky motion involved lead to stress and eye strain and are unsuitable for use, for example, in business, industry, research, and in the surgical theatre.

Other variables that are pertinent in the production of high-quality stereo video include picture resolution, brightness, and color reproduction, presence of display or processing artifacts, and width and depth of the viewing field. Autostereoscopic methods, for example, have not yet overcome problems with resolution and providing a satisfactory viewing zone for multiple viewers as is often required in business and medicine.

A factor limiting the commercial success of traditional stereoscopy has been adverse physical reactions including eyestrain headaches and nausea experienced by a significant number of viewers of these systems. Illustration is provided by the 3D movies that were popular briefly in the 1950's and '60's. While a limited number of 3D movies continue to be produced today, and are popular in theme parks and like venues, these movies are typically limited to less than about 30 minutes in length, because the average viewer tolerance for these media is limited. Viewer-tolerance problems are intrinsic to the methodology of traditional stereoscopy, and result from the inability of these systems to realistically emulate the operation of the human visual system. Such systems are also limited due to a failure to account for the central role of the human brain and the neural cooperation employed therein for effective visual processing. The relevance of this point to the present invention will be elaborated upon hereinafter.

The efficient conversion system of the present invention can produce highly realistic, accurate, and visually-comfortable 3D video imagery in effective real-time from a single camera source. This is advantageous for several reasons. First, the present invention produces a "synthesized" stereoscopic video presentation which is not prone to the limitations noted above associated with traditional stereoscopy. Second, systems based on this synthetic stereo are automatically compatible with virtually all existing single camera video systems as used in business, industry, and research, and especially existing biomedical video (i.e., endoscopy, microscopy, and other) systems since they require as their input signal the same 2D video input signal that drives the normal 2D display monitor.

Another method of synthesizing a three-dimensional image from a two-dimensional source includes the "DeepVision" system from Delta Systems Design, Ltd. and AVS, a division of Avesco, London, England. It is believed that this system employs three mechanisms for producing a three-dimensional view from a two-dimensional video source: spatial parallax from the spatial offset of sequential video frames; a "temporal parallax" arising from the translation of motion-displaced objects from adjacent frames into spatial parallax; and a "short-term visual memory" arising from an imposed time delay between successive video frames.

The processing of video imagery employed by the earlier DeepVision system stands in contrast to that employed by traditional video stereoscopy. Traditional stereoscopy, as noted above, has commonly employed a binocular system, e.g., using two lenses, or two cameras, to produce the two channels of visual information; the critical factor that produces depth perception in these systems is the spatial parallax brought about by the spatial offset of the presentation of the two input channels. While it is evident that binocular parallax is a sufficient condition for producing depth-enhanced imagery, the DeepVision processing approach demonstrates that it is not a necessary condition. DeepVision produces depth-enhanced imagery from a single, monocular source, through manipulation of hitherto unappreciated "depth cues." In particular, these "depth cues" include motion and visual persistence, or "memory." The early DeepVision method demonstrates the apparent existence of neural mechanisms in the human eye-brain system, in addition to those involved in processing binocular parallax information, which are active in depth perception.

The quality of video imagery produced by the early DeepVision system has been observed to differ in some respects from binocular stereo video images. While many observers have been unable to distinguish between the 3D DeepVision video image derived from a monocular source and a traditional 3D image from a binocular source, others have commented that there is an appearance of less depth in certain scenes, or that the DeepVision images appear either on or behind the plane of the display screen, but never in front of it, as is possible with binocular stereo. These differences are again attributable to the different methods employed in producing 3D imagery in these two modalities.

The strength of binocular stereo lies in its ability to produce consistent depth enhancement within the "zone of convergence," i.e., the region defined by the overlap of the viewing zones of each of the two viewing elements (lenses or cameras). However, unlike human vision which can adapt its binocular focus rapidly and continuously adjust axially for different viewing depths, the two camera axes of binocular stereovision are fixed, and no such axial adjustment capability is found in these stereovision systems. Thus, objects viewed outside the convergence zone may appear distorted and can produce eyestrain in the viewer.

Monocular DeepVision video, by contrast, provides no fixed zone of convergence. While this allows viewer concentration to range freely within a given scene without eye strain, the perceived sense of depth may not always appear to be consistent, particularly in those scenes where there are rapid shifts in the field-of-view or where there is rapid motion.

"Motion artifacts," seen as an unnaturally jerky or discontinuous representation of movement in the viewed image, are occasionally observable when rapid movement occurs between successive video frame images in the earlier DeepVision system. Differences in three-dimensional effect may also vary for images of the same scene when viewed in systems implementing the PAL specification, as compared with systems implementing the NTSC system. This may be due to a longer interframe delay in the two systems.

A further limitation of existing video stereo systems is the absence of integration of these systems with modern computer technology. These systems have been created as "enhanced" television systems, rather than as fully digital computer-based systems with 3D capability.

SUMMARY OF THE INVENTION

The present invention is based on improvements to the aforementioned DeepVision video processing system in order to optimize 2D–3D systems for mission critical applications, such as research and biomedicine and specifically for realistic high accuracy fields such as minimally invasive surgery. These systems, while described in the several embodiments herein will be understood by the person having ordinary skill in the art as offering a fundamentally different approach to the creation of 3D stereoscopic video output. The present invention utilizes digital processing which transforms the single-channel video input signal into two channels of processed signal output. These signals may then be displayed using one of several techniques common to the art of traditional video stereoscopy.

The present invention is based on digital video processing, whereas traditional stereo video is fundamentally based on analog video processing while sometimes employing limited digital methods. The present invention contemplates construction of an all-digital embodiment of the 3D system. This preferred embodiment of the invention will be discussed in detail below.

The ability to transform a single monocular, two-dimensional image into a three-dimensional image displayed on a color monitor is also highly desirable in related biomedical fields, including microscopy, medical education, medical teleconferencing, and teleradiology.

Another advantage of the real-time conversion capability from standard video sources into 3D made possible by the present invention is the ability to interface with virtually all conventional video storage media, e.g., VHS videotape, laserdisk, and CD/CD-ROM media. The input 2D video signal may also be compressed, transmitted (as by telephone lines) and decompressed for conversion, in substantially "real-time" mode. Other known stereoscopic video systems require complex electronics to allow record and playback with standard recording media. This is because the traditional stereo systems are based on two channels of video signal information; multiplexer and demultiplexer circuitry is therefore required to compress the two channels into a single channel in order, for example, to record and playback from a conventional VHS video recorder. By contrast, no additional electronics is required to process the video signal from any standard video storage media or communication device with the present invention. In business and research, a conference or experiment may be recorded on conventional VCR apparatus. In medical use, for example, surgeons performing minimally invasive surgery may simply record the procedure as they would normally using the 2D video signal. This same 2D video signal is then transformed for live, real-time 3D viewing as the procedure is conducted. Following completion of the surgical procedure (or at any time during the procedure when desired) medical personnel may view the VHS recorded video by merely replaying the video recording on the VCR rather than receiving a live signal from the video camera. The present invention also allows playback, conversion, and 3D viewing of all pre-existing VHS tape media.

Plural embodiments of the present invention are disclosed, including an embodiment limited to biomedical applications and others with broader application in business, industry, and science, for example. Generically, these embodiments are described in terms of three main functional components:

(a) a module for high resolution digital acquisition of a (standard) video input signal, (b) a digital processor module for transforming the digitized input signals for subsequent display as 3D video images, and (c) display apparatus for viewing of synthesized 3D video.

The person having ordinary skill in the art will recognize that functional modules (b) and (c) can be implemented in a variety of ways. The digital processor module (b) transforms the 2D input video signal according to methods to be described in detail hereinafter and then formats the transformed video for subsequent 3D display. In one embodiment, the digital processor module (b) formats the transformed video under program instruction set control for subsequent 3D display.

The digital processor module may be implemented in various ways, including dedicated digital hardware, software processing on a general-purpose image- or video-processing card such as those currently available for microcomputers and workstation computers, and hybrid electronic implementations which utilize both hardware and software. Specific examples will be described hereinafter. Similarly, the display module (c) may take, for example only, the commonly known forms of display for traditional two-lens or two-camera stereoscopic video systems, including twin-screen/beamsplitter optics, single-screen field/frame multiplexing, autostereoscopic systems, projection displays, and head-mount displays such as those used in virtual reality systems.

In view of the foregoing limitations and shortcomings of the prior art devices, as well as other disadvantages not specifically mentioned above, it should be apparent that there still exists a need in the art for a system and method of producing accurate, reliable, highly realistic three-dimensional images from a source such as a single camera. This is especially true for the biomedical field, where presentation to medical personnel of realistic high-accuracy 3D images from single camera sources used in endoscopic and laparoscopic surgery enables life- and lifestyle-saving procedures.

It is, therefore, a primary object of this invention to fulfill that need by providing a system for synthesizing an apparent three-dimensional or stereo image from a two-dimensional video image in a wide range of settings. Another object of this invention is to enable conversion of two-dimensional video signals into accurate and realistic three-dimensional images as is required for laparoscopic surgery with a single camera. This feat must be accomplished substantially in real-time.

Briefly described, the aforementioned objects are accomplished according to the invention in its preferred embodiments by providing a stereoscopic imaging system, which includes a single monocular source of a two-dimensional video signal; apparatus for converting the source video signal to a field (or frame) multiplexed three-dimensional single-screen display signal; a video display apparatus for imaging field multiplexed video signals in human-viewable form; liquid-crystal light-conducting viewing glasses (which may be hat or helmet mounted) adapted for alternate left-eye, right-eye viewing of the video display by alternate shuttering; and apparatus for controlling alternate left-eye, right-eye shuttering of the glasses.

This is accomplished by methods including the steps of: acquiring and digitization of a two-dimensional single monocular source video signal (e.g., standard PAL, NTSC, or equivalent video); digital electronic implementation and improvements to the DeepVision process for enhancing depth information; production of two channels of electronically processed video, one alternately to be delivered to the right eye for viewing, the other to be subsequently delivered to the left eye, converting the electronically processed video signals to a frame- or field-multiplexed stereoscopic display signal; displaying the multiplexed video signal in human-viewable form on a single-screen video display; viewing the video display with glasses or the like adapted for alternate left-eye, right-eye viewing; and controlling alternate left-eye, right-eye shuttering of the glasses in synchronism with display of the frame- or field-multiplexed video signal.

It is an advantage of the present invention that the images can be viewed in normal 2D by selecting a switch setting on the instrument. This means that, should difficulties arise with the 2D-3D conversion equipment, the medical procedure can ordinarily be continued through use of conventional 2D viewing.

The importance of an all-digital 3D video imaging system presages the current trend towards integration of conventional video technology and digital computer technology. A synthesized stereoscopic imaging system having 3D video capability based on a modern computer platform can be continuously upgradeable with advances in technology, either through the modular addition of new hardware or through software-only upgrades. Further, such a "multimedia" computer-based system offers 3D video imaging as an enabling technology which can be integrated into an ever-expanding array of new technologies likely to be of increasing importance in perceived future business, industry, research, and biomedical fields. These sectors have been adapting computerized technologies for over a decade, and the trend continues. For example, minimally-invasive surgery may incorporate a variety of computerized technologies in the near future, including robotically-controlled instrumentation, so-called "smart sensors" for position and motion tracking, digital network connections, e.g., for on-line access to medical and patient records, image data-fusion which integrates imaging records from multiple modalities, e.g., computer tomography (CT), magnetic resonance imaging (MRI), and ultrasound. These functions can be coordinated for the operating theater by a powerful small PC or workstation computer; 3D viewing capability can also be a featured function of this computer.

With the foregoing and other objects, advantages, and features of the invention which will become hereinafter apparent, the nature of the invention may be more clearly understood by reference to the following detailed description of the invention, the appended claims, and to the several views illustrated in the attached drawings.

DETAILED DESCRIPTION OF THE PREFERRED EMBODIMENTS

Figure 1:
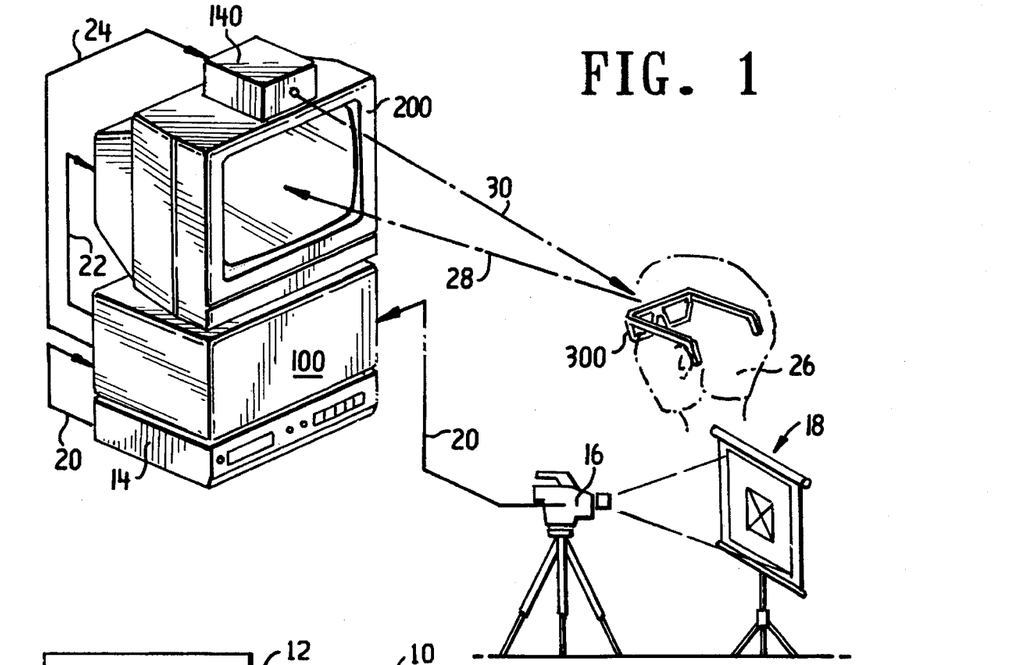
FIG. 1 is a simplified pictorial diagram of the invention in use.
Figure 2:
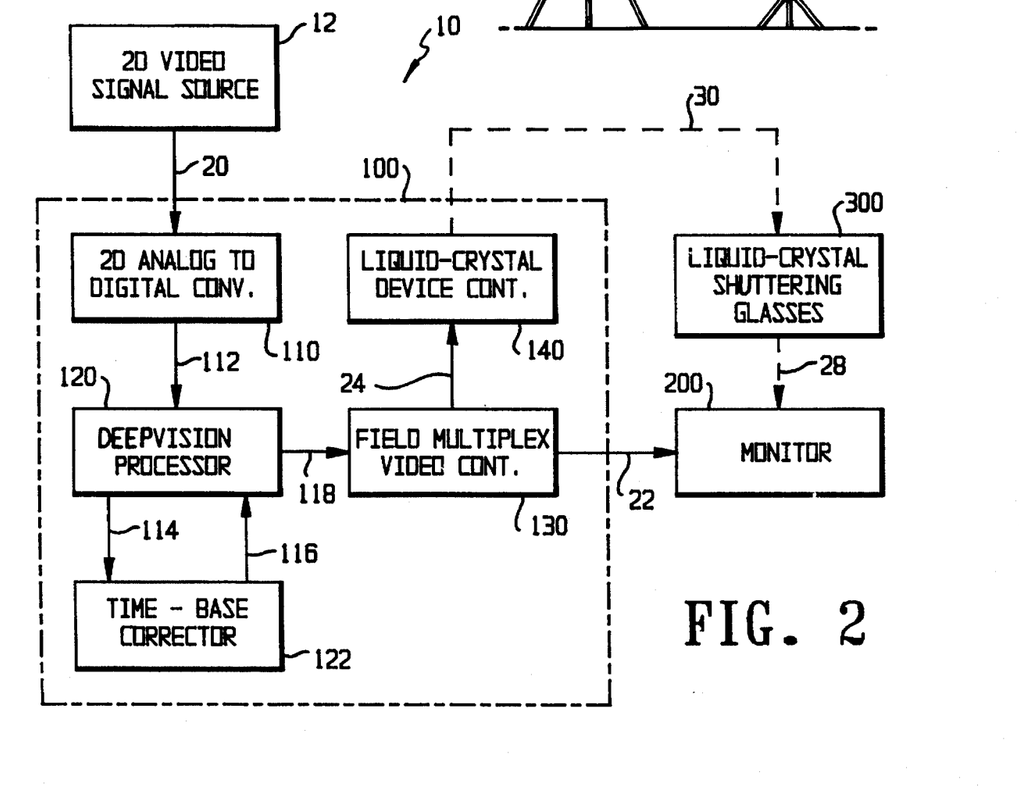
FIG. 2 is a simplified block diagram of one embodiment of the present invention.

The present three-dimensional medical imaging system invention may be broadly understood by reference to FIGS. 1 and 2, in which a typical use of a first embodiment of the invention 10 is illustrated.

A video signal source 12 provides a two-dimensional (2D) analog output signal representing an image, especially a sequence of images to the system. Typical source apparatus includes a video recorder 14 producing a monocular output signal, a video camera 16 viewing a scene 18 and producing a monocular output signal, including monocular cameras such as a laparoscope, endoscope, or other medical camera, a video scanner (not shown), or other equivalent apparatus capable of producing a 2D monocular source video signal 20. Note that while the present discussion is directed primarily to analog video signals in the NTSC or PAL formats, other signal formats, including both analog and digital may be used as is known to those persons having ordinary skill in the art.

The analog video signal 20 is directed to a converter 100 for converting the source video signal 20 to a field multiplexed three-dimensional single-screen display signal 22 for display on a monitor 200. Differing embodiments of the present invention, directed to variations in the configuration and operation of converter 100 elements, are described in greater detail hereinafter.

A blurry, seemingly out-of-focus, conventional 2D image is observed by those not wearing the special liquid-crystal light-conducting/shuttering viewing glasses 300. A switch 21 on the converter unit 100 allows the user to bypass the 2D-3D conversion in order to view scene as ordinary 2D video imagery. However, an observer 26 wearing glasses 300 is enabled to view the monitor 200 image as a simulated three-dimensional (3D) image seen along a viewing path 28 under control of a special liquid-crystal device controller 140 which controls shuttering of the left eye and right eye lenses of the glasses 300, and therefore the view of the observer, according to a signal 30 directed to the observer 26 and viewing glasses 300.

Glasses 300 are known to those persons having ordinary skill in the art; one source of liquid-crystal light-conducting glasses believed acceptable includes the Stereographics Corporation, of San Rafael, Calif. U.S. Pat. No. 4,884,876 describes the operation of glasses 300. The individual lenses may also be mounted in other headgear, such as a helmet or similar viewing equipment.

Turning now to the greater detail of converter 100 illustrated in a first embodiment of the present invention 10 as shown in FIG. 2, an analog-to-digital (A/D) video signal conversion circuit 110 is shown receiving the source video signal 20. Either 8- or 24-bit A/D conversion can be used, with 24-bit conversion providing 'true-color' digital representation equivalent to the full-color displays offered in conventional analog television receivers. As video technology develops, the person having ordinary skill in the art will recognize that the electronic modules described in FIG. 2 may exist in some instances as stand-alone, commercially available electronic products and in other instances be implemented as custom circuitry.

Digitized output from converter 110 on signal line 112 is directed to a DeepVision signal processor 120. A DeepVision Controller module, produced under license from Delta System Design Limited (London WC2, England) available from AVS, a Division of Avesco, London, England, has been found suitable in experimental use. This device is explained in greater detail in World Intellectual Property Organization publications WO 92/11735, WO 92/03021, and WO 90/13848, which have been published under provisions of the Patent Convention Treaty. The DeepVision processor 120 is a digital image processing circuit which comprises image buffers for storage of digitized video frames as well as circuitry to convert the input digitized video signal on line 112 into time displaced, image shifted video information. The timing signals necessary to ensure proper, synchronized operation of the converter 110 may be provided by specialized programmable timing chips such as Synchronous Pulse Generators (SPG's) or by microprocessors.

A time-base corrector circuit 122 may be required in certain embodiments in cooperation with the DeepVision processor 120 for determining various time relationships and generating certain time-based clock signals which are required by the processor 120. A HOTRONICS, Campbell, Calif, Model AP-41 time-base corrector has been used in the present invention. Functionally, the time-base corrector provides frame registration correction, especially for VHS video signals. Input signals from the processor 120 are received, line 114, processed, and frame registration correction output signals are communicated to the processor 120 on line 116. The DeepVision processor 120 output is provided on line 118.

A field/frame multiplex video controller 130 serves as the digital electronic interface and driver circuitry for the display monitor 200 via line 22. The person having ordinary skill in the art will recognize that in some instances this module may operate with video fields while in other instances it may operate with full video frames. The field/frame multiplex controller consists of a video frame buffer which stores the digital video signals prior to their read-out to the display monitor 200. The field/frame multiplex video controller 130 also generates as part of the video signal the timing signals on line 22 necessary to drive display monitor 200 at double its normal vertical refresh rate (e.g., 120 Hertz per second for NTSC video). Video controller 130 stores two or more complete images for left and right channel output in each standard display interval. A Stereo Video Display Controller 140 (Stereographics, San Rafael, USA) connected as an emitter control output from the field multiplex video controller 130 receives a control signal on line 24. The liquid-crystal device controller 140 is an emitter device which in turn controls the liquid-crystal lenses for the left eye/right eye shutter switching of the viewer glasses 300.

The field multiplexed video signals are output on signal line 22 to a monitor 200 for viewing. While various combinations of horizontal and vertical scanning may be used successfully with the present invention, typical scan rates of 120 Hertz vertical and 37.5 Khz which result in left- and right-channel outputs at 60 fields per second or 30 flames per second are believed useful. A Sony multi-sync monitor, such as the Model 2036S or Model 2038, is believed suitable for viewing the 3D images synthesized from 2D images with the present invention 10. A 20-inch (diagonal measurement) monitor 200 is believed suitable for most business, manufacturing, research, and biomedical uses, as in operating theaters. A plurality of monitors 200 can be used. For individual viewing, smaller, individual video displays may be used, while for group viewing, larger monitors or projection viewers may be used, as known to those persons having ordinary skill in the art.

Figure 3:
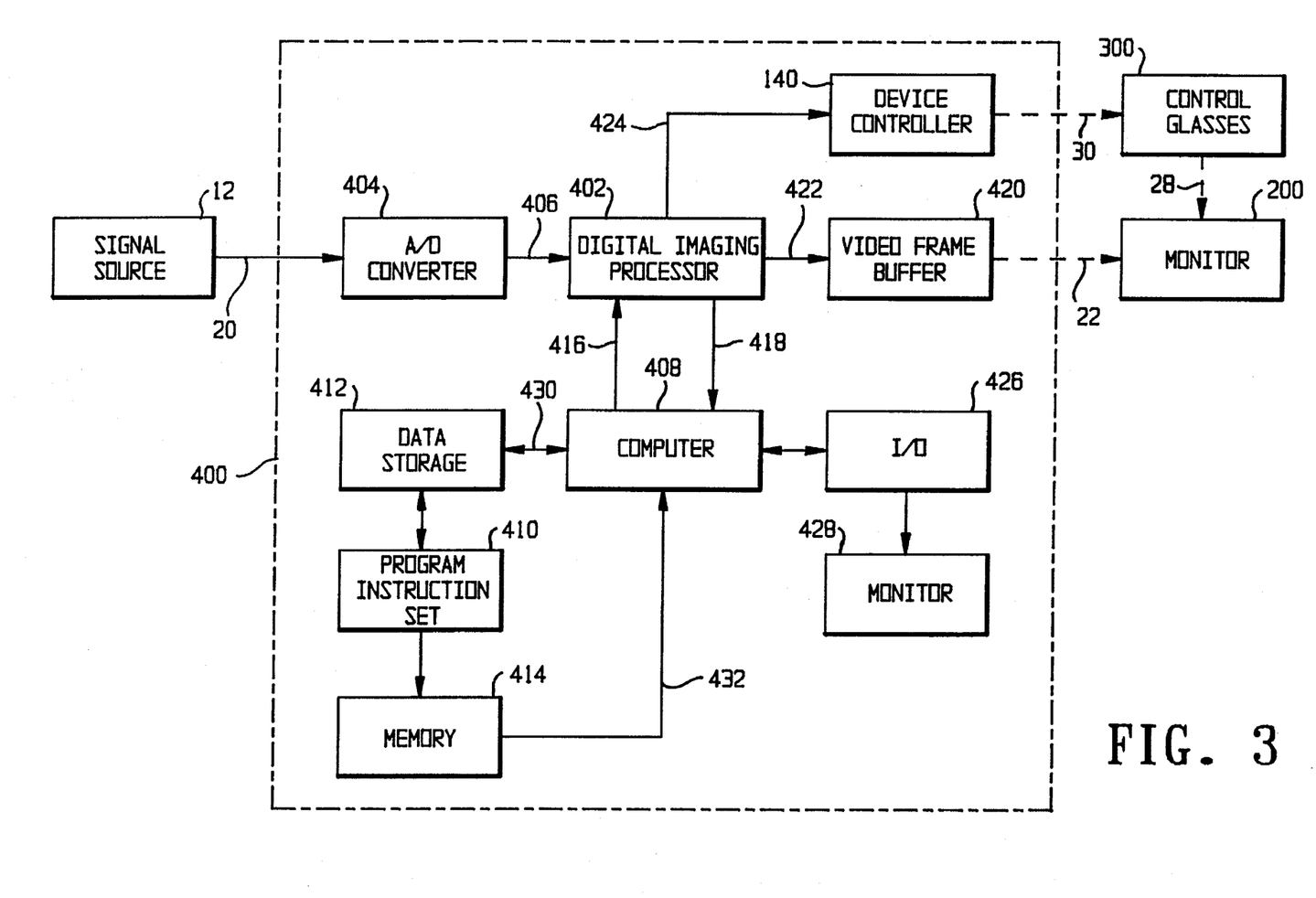
FIG. 3 is a simplified block diagram of another embodiment of the present invention.

Another embodiment 40 of the present three-dimensional medical imaging system invention is shown in detail in FIG. 3, using a microcomputer and digital imaging processor to optimize the conversion process and improve resolution of the displayed images. This system, which may be built around a general-purpose small computer or workstation, is capable of further optimization through software control.

A source 12 of 2D video image signals, especially a sequence of images, is supplied to the system as with the first embodiment previously described. Again, typical analog video image source apparatus includes a video recorder 14 producing an output signal, a monocular video camera 16, or other equivalent apparatus capable of producing a 2D monocular source video signal 20. The analog video signal may be provided in either the NTSC or PAL (or equivalent) formats; again, other signal formats, including both analog and digital may be used as is known to those persons having ordinary skill in the art.

The analog video signal 20 is directed to a 2D–3D converter 400 for convening the source video signal 20 to a time-multiplexed three-dimensional single-screen display signal 22 for display on a monitor 200.

In this second embodiment of the three-dimensional medical imaging system 40, all-digital processing is applied to the digitized 2D signal 20 in the 2D–3D converter 400. The digital imaging processor 402 is typically programmable and may operate under local control with its own on-board central processing unit (CPU), or alternatively under control of the host computer 408. This architecture is generalized, and may be implemented by a variety of circuit modules as add-in circuitry to conventional microcomputers or workstation computers.

The 2D analog video signal 20 is digitized in high-resolution video A/D converter circuitry 404 providing 24-bit color digitization from NTSC, PAL, S-VHS, or Y/C compatible signal inputs. Applicants note that real-time color space conversion (RGB-HSI-YIQ) of the video signals may also be performed in a suitably equipped digitizer. Following conversion in the digitizer 404, the digital video signal 406 is output from the digitizer.

Digital video signal 406 is processed in a digital imaging processor, typically a programmable digital imaging processor 402. For the present illustrative embodiment, a Matrox Co., Montreal, Canada, Model IM-1280 or equivalent image processor is used, under control of a fast small computer, which may be a microcomputer 408 of 32-bit or greater bus capacity, such as is provided with an Intel 486 or Pentium series (or such equivalents as are known to those persons having ordinary skill in the art) microprocessor chip from numerous manufacturers. The IM-1280 image processor can be supplied on standard sized PC microcomputer cards which communicate with the CPU of host microcomputer 408 via the microcomputer bus. When in operation, the imaging processor card itself performs instructions according to a program instruction set 410 which can be read from the host computer data storage 412 to memory 414 and stored locally. These instructions are executed under local control of the CPU resident on the image processor board. Instructions and data on the board are transmitted along a high-bandwidth local bus. A 32-bit wide or greater bus is preferred. The person having ordinary skill in the art will recognize that other communications channels may also be used with appropriate bus standards. Digitized signal 406 is communicated to an input to the imaging processor 402. The digitized video output on line 406 comprises a stream of sequential video frames of data.

Digital imaging processor 402 receives control input, and other signals from the microcomputer 408 on signal lines 416, while communicating control output, and other signals to the microcomputer on signal lines 418. The stream of sequential digitized video frames received on signal line 406 is processed under computer control to provide a temporally- and spatially-offset series of video frame images which are stored in a video display output buffer 420 prior to display on video display monitor 200. One form of implementation the software-based signal processing utilizes a data structure known as a circular queue and will be described hereinafter. The frame image data is selected from among the data temporarily stored in the circular queue and provided as an output on signal line 422 to the video frame buffer 420.

Also provided (by imaging processor 402) are a device controller signal on signal line 424 for controlling the liquid-crystal device controller 140 which controls left-eye/right-eye shuttering via liquid-crystal light control glasses 300, described above.

Microcomputer 408 is conventionally equipped with memory 414, storage 412 (which may be a disk drive), and input/output functions 426, including a keyboard, and a local PC monitor 428. Provision is ordinarily made for a program instruction set within the microcomputer, where this data set may reside in disk or other equivalent storage for long-term, ready accessibility. Data storage 412, which is intended to include long-term storage, either volatile or non-volatile or both, as known to those persons having ordinary skill in the art, communicates with the microcomputer 408 along signal lines 430 and memory 414 communicates along line 432. Other communication, including the human-machine interface is represented here by I/O block 426, and specifically includes a keyboard (not shown) and a local monitor 428 for operation of the microcomputer 408.

Figure 4:
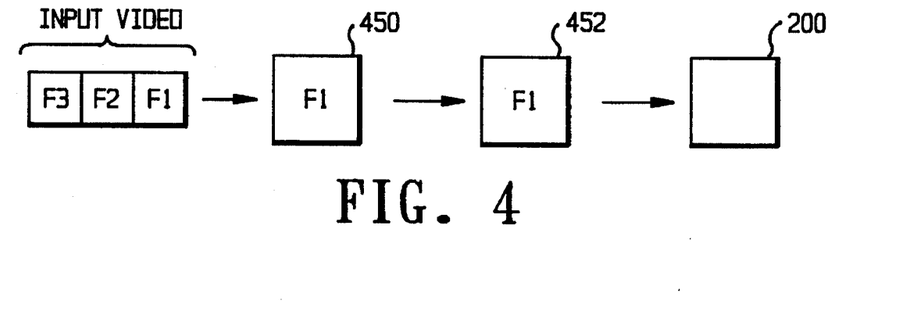
FIG. 4 illustrates a pictorial representation of the normal sequence of 2D video processed without conversion to 3D.

At signal line 406 a 30 frames per second (Fps) stream (for NTSC video) of sequential digitized video frames is output from the analog to digital converter 404. For a conventional 2D display as illustrated graphically in FIG. 4, a stream of input video frames F1, F2, F3, . . . , is received, stored in a storage buffer 450, transferred to a display buffer 452, then reconverted from digital to analog data prior to being scanned out to a monitor 200. The display rate for NTSC video signals is 60 fields per second (fps), since each frame is comprised of two alternating fields. That is, all the (e.g.) odd-numbered horizontal trace lines forming a first image are communicated, then all the even-numbered horizontal trace lines are communicated. The lines of the first and second fields are interlaced in the display at 60 Hertz to provide the complete high resolution frame, displayed at a 30-Hertz rate. Of course, the PAL rates are 50 and 75 Hertz, respectively. The fields are simply scanned out on the monitor in sequence from the display buffer.

High-performance video digitizers are known which provide a capability of converting interlaced video signals to non-interlaced signals, using "line-doubling" or other comparable techniques. The line-doubling technique effectively doubles the frame rate of the video system, i.e., to 60 Fps, rather than 30 Fps. With these systems full flames of image data are moved from the storage buffer 450 to the display buffer 452, and after reconversion to analog data are scanned out to a monitor.

The present invention utilizes a time-multiplexing display technique. In the time multiplexing method of display applied to traditional stereo video imaging, there are two incoming video streams, one from each lens or camera in the binocular vision apparatus and each lens or camera in the binocular vision apparatus and each eye therefore receives one stream of video data. In time multiplexed systems, two fields or flames of video information are stored in the display buffer and scanned out to the display, which is driven at twice its normal refresh rate. Therefore in one scan interval, i.e., one field or frame period, two fields or frames of video are scanned out, one to each eye. These systems require synchronized shutter glasses to properly decode the displayed video, e.g., so that the left eye always sees the first of the time multiplexed images and the second eye sees the second image in each display interval. The present invention also uses time multiplexing but in the present invention each eye views its own copy of the single input video stream, as depicted graphically in FIG. 5, which is altered according to the 3D synthesis processing methods of the present invention, i.e. , spatially offset and temporally offset (i. e., time delayed).

Figure 7:
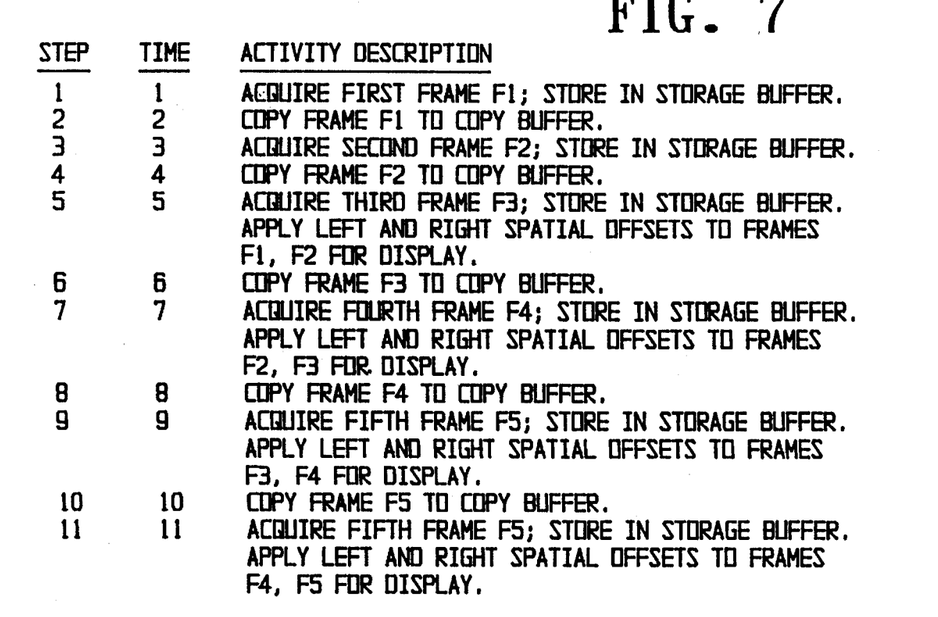
FIG. 7 is a description of the program instruction set steps relating to the process of FIG. 6.
Figure 8A:
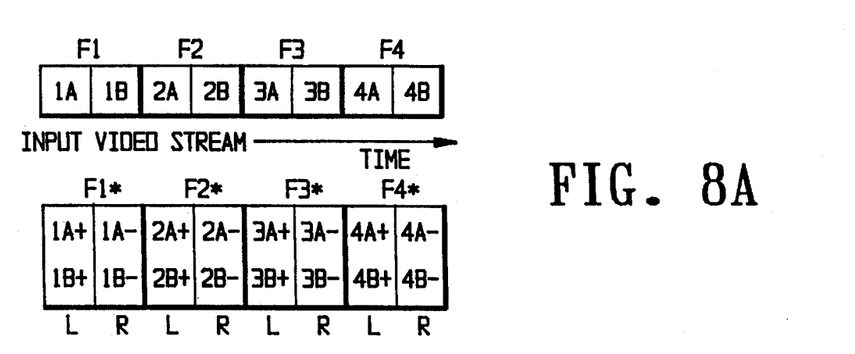
FIGS. 8A, 8B, and 8C illustrate pictorially time multiplexing of the video fields with differing temporal offsets.
Figure 8B:
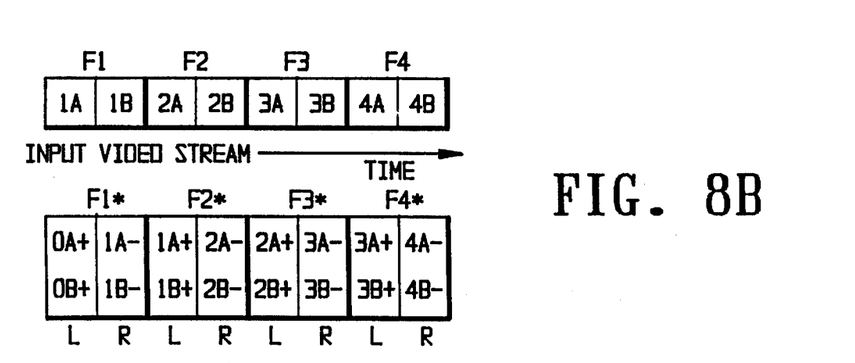
Figures 8C, 9:
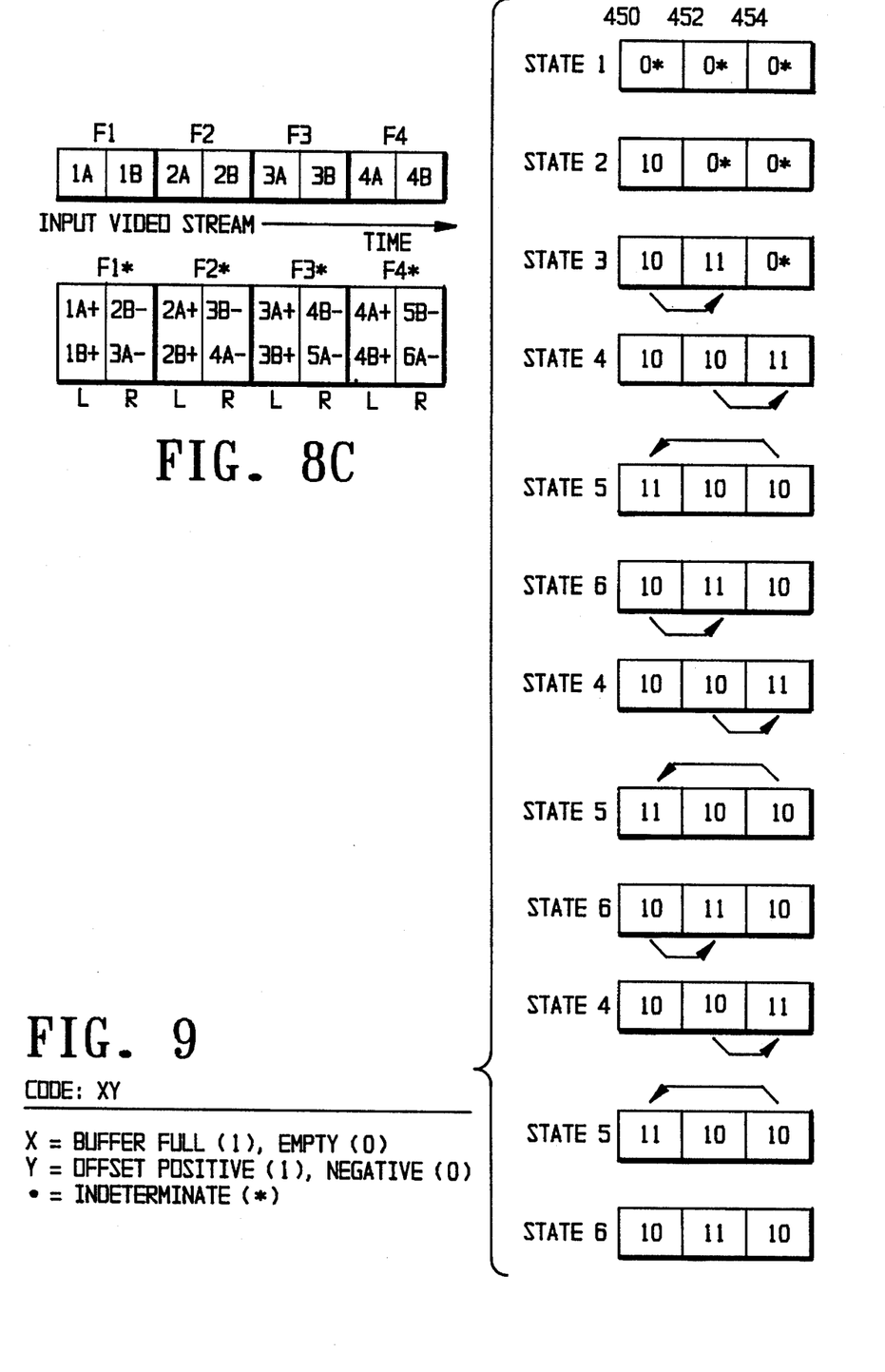
FIG. 9 illustrates the state-space descriptions of the circular queue structure for implementing the process of FIG. 7.

The basic processing methods used to implement the synthesized 3D stereoscopic video system will now be described by reference to a diagram showing time multiplexing of the video (FIG. 5), a pictorial time-line diagram (FIG. 6), a tabular listing of steps in the processing sequence (FIG. 7), and a discussion of variations of the basic processing method whereby the time delay between the left eye stream and the right eye stream is varied, using a field-multiplexing form of processing (FIG. 8).

Figure 5:
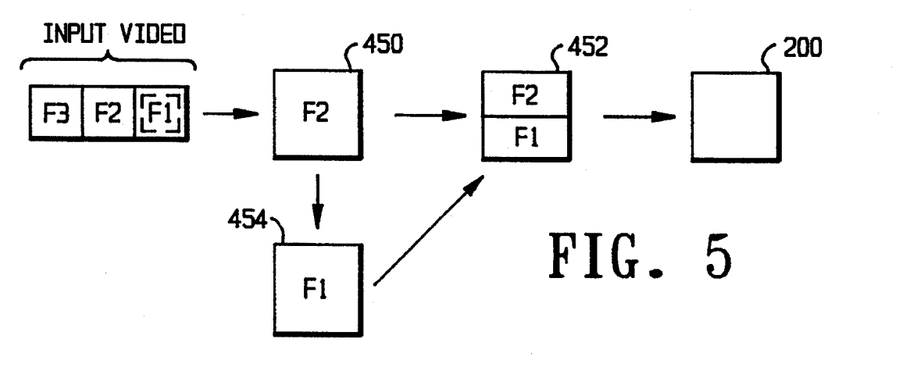
FIG. 5 illustrates pictorially time multiplexing of the video to provide separate streams for each eye.
Figure 6:
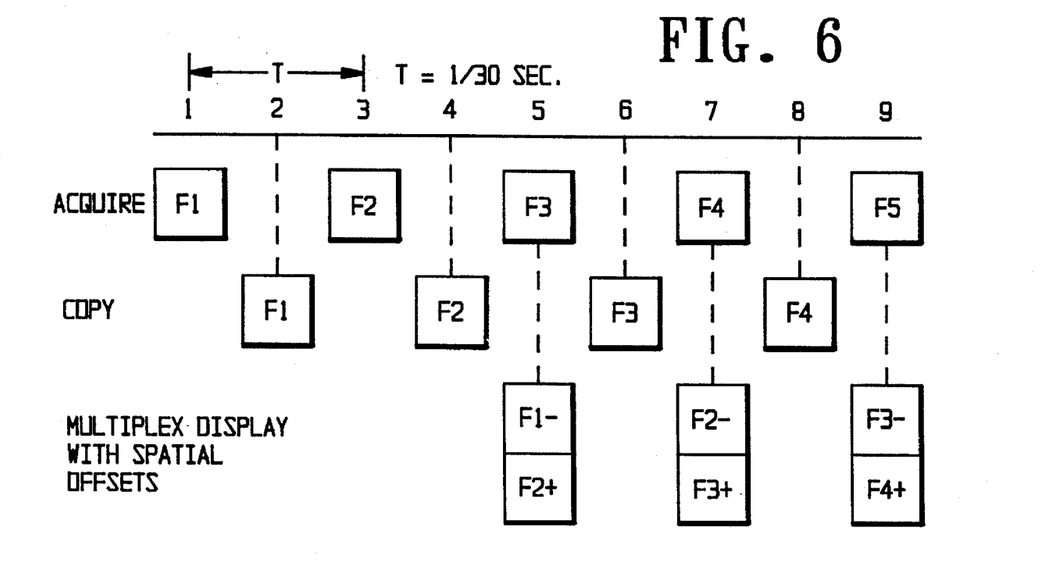
FIG. 6 is a pictorial time-line illustration of the video frame acquisition in the storage buffer, the copy buffer, and multiplex display from the display buffer with spatial offset, incorporating the temporal display from frame to frame.

The fundamental elements required for this processing are illustrated in FIG. 5, which shows an input video stream of sequential video frames, F1, F2, F3 . . . and three separate image buffers, indicated as storage buffer 450, copy buffer 454, and display buffer 452 through which the input video stream passes in predetermined order, and FIG. 6 represents a time-line view of the processing applied to the input sequence of video frames. The "clock" which regulates this processing is derived from the timing of the input video signal, i.e., 30 Fps for NTSC video, or 1/30 second for each input video frame (25 Fps for PAL video, or 1/25 second for each PAL input video frame). It is noted that, depending on the particular hardware electronics configuration (first embodiment) or software processing technique (second embodiment) employed, the operations used to encode video data for 3D display and to format video data for 3D display may use either video fields (½ frames) or full video frames as the basic image entity upon which such processing is performed. The following elaboration of the fundamental processing sequence employed for the creation of synthesized stereoscopic video imaging applies equally to either field or frame processing.

Two fundamental operations are performed on the incoming video data in order to encode the resulting signals for presentation of a 3D display. These operations comprise a temporal delay, typically of one frame between the image as seen by the left eye and that seen by the right eye, and a horizontal spatial shift between the images seen by each eye. These basic operations proceed in a fixed temporal sequence as indicated in FIG. 6. The sequence begins at time T1 with the acquisition of the first frame of video data, F1 by storage buffer 450. At time T2, frame F1 is copied into copy buffer 454. The sequence continues from T3 to T5 with the second frame F2 acquired and copied. At time T5, while the next input video frame F3 is being acquired, the previously acquired and stored frames, i.e., F1 and F2 are scanned out of the display buffer to a time-multiplexed display monitor 200. A spatial offset is applied to the two images as they are displayed, so that they appear horizontally displaced one from the other. Viewed through synchronous electronic glasses 300, the left eye will see one image, i.e., frame F1 with a negative spatial displacement and the right eye will see the other image, i.e., frame F2, with the opposite spatial displacement. This basic processing sequence is then repeated ad infinitum.

The spatial displacement between each image in a displayed pair of flames is approximately 0–25% of the screen width (i.e., one horizontal trace line), and preferably 10–20% of the screen width. A spatial displacement of about 15% of the screen width is preferred, calibrated to the particular size of the monitor being used. The offset may be accomplished for the left eye presentation by removing the first picture elements at the beginning of a given trace line and completing the line with black picture elements. For right eye presentation, the trace line is begun with the incorporation of black picture elements at the beginning of the trace line and the ending picture elements are removed. The same number of picture elements are removed from each trace line and for the flames for each respective eye. Similarly, the same number of black picture elements are added to each trace line and for the frames for each respective eye.

The time delay between the pair of video images displayed in each display interval can be varied, as for example by a period equal to one field delay period, two field delay periods (i.e., one frame period) or three field delay periods (1 ½ frame periods). Varying the image-pair delay period alters the 3D effect in the view presented the viewer wearing emitter-controlled glasses 200. A longer delay increases the 3D depth effect, but may result in certain inconsistencies in the perceived images, particularly where considerable motion is present in the scene. Alternatively, a shorter inter-image delay reduces the depth effect, while providing a more consistent visual perception for moving objects.

FIGS. 8A, 8B, and 8C illustrate schematically the technique employed for providing time delays of equal to the period of 1, 2, or 3 fields by utilizing field-multiplexed processing and display.

When a series of frames F1, F2, F3, F4, . . . , are received, FIG. 8A, each with two fields (1A, 1B; 2A, 2B; 3A, 3B; 4A, 4B; . . . ;), converter 100 (first embodiment) or the digital imaging processor 402, under computer control, must produce four sets of image data per frame as seen in FIG. 8A. The identification scheme used herein is as follows: the field and frame identifications are to be read from left to right, then from top to bottom, within a given frame. A first field 1A represents a first field of the first frame (F1) from the left (L) eye stream, and a second field 1B represents the second field of the first frame from the left eye stream. First and second field 1A and 1B are also generated for frame one (F1) for the right (R) eye. Similar fields are generated for each eye for each of the succeeding frames, frame F1–F4. This represents the field multiplexed video streams with a time delay equal to 1f, or one field, for each eye.

A spatial offset is also generated for each field (1A, 1B) of each frame (F1–F4) for each eye stream. In FIG. 8A, this is represented by a positive symbol (+) or a negative symbol (–) suffix following the field identification (e.g., 1A+, 1A– and 1B+, 1B–). Thus, the first field 1A, offset horizontally, is presented for the left eye, from the left eye offset, is presented for the right eye. Next, the left and right eye second fields are presented. Frame two is then displayed in this field multiplexed form. In sequence the frame data of frame 1 in FIG. 8A is read out to the viewer in order: 1A+, 1A–, 1B+, 1B–.

The presentation of successive fields from each left-eye/right-eye stream delayed by a period of 1F (i.e., 2f) is illustrated in FIG. 8B. Again, the video stream is divided, left eye, right eye, and the fields among the frames are time delayed.

At a first time, field 0A (which may be the preceding frame first field) is displayed, horizontally displaced (i.e., 0A+), for the left eye, then the first field of the first new frame F1 is displayed, also horizontally offset in the opposite direction: 1A–. Next, the preceding frame second field is displayed, horizontally offset: 0B+ for the left eye, then the second field of the first new frame F1 is displayed, also horizontally offset in the opposite direction: 1B–. A 1F (2f) time delay is thus effected. In the next frame, first field 1A+ is presented for the left eye, then field 2A– for the right eye, then field 1B+ for the left eye and field 2B– for the right eye and so on.

The presentation of successive fields from each left-eye/right-eye stream delayed by a period of 1.5 F (i.e., 3 f) is illustrated in FIG. 8C. Again, the video stream is divided, left eye, right eye, and the fields among the flames delayed. Field 1A+ is displayed at a first time, horizontally displaced, for the left eye, then the second field of the second frame F2 is displayed for the right eye, also horizontally offset in the opposite direction: 2B–. Next, the first frame second field is displayed for the left eye, horizontally offset: 1B+, then the first field of the third frame F3 is displayed for the right eye, also horizontally offset in the opposite direction: 3A–. A 1.5 F (3f) time delay is thus effected. In the next frame, first field 2A+ is presented for the left eye, then 3B– for the right eye, then 2B+ for the left eye and 4A– for the right eye, and so on.

A "circular queue" data structure is one structure for implementation of the 3D processing step; this data structure is particularly well suited to the computer-based digital embodiment of the present invention as discussed above, because the rules governing operation of the circular queue may be implemented entirely in software. It is convenient to use a "state-space" description for the operation of the circular queue (FIG. 9).

The circular queue exists in memory (which may be separate in the video frame buffer 420 or portions of the microcomputer 408 memory 414) as three image buffers. For the present example, the circular queue will be described as being implemented in hardware, e.g., as three distinct regions of digital memory allocated within the video frame buffer 420. Each image buffer will have a "state" defined by two variables, x and y, in FIG. 9, where x designates whether an image is present or not in the buffer and y designates whether a positive or negative spatial offset is applied to the image residing in the buffer. An asterisk: "*" indicates an indetenrtinate state.

In operation, the states of each image buffer are updated upon each clock cycle; the clock speed in this case is determined by the input video frame rate, e.g., 30 frames per second (Fps) for a NTSC video signal. Since the present invention uses a time-multiplexed display, the contents of two out of the available three buffers are displayed in each clock period; this is indicated by an arrow connecting the two buffers being used for display in a given state.

At state 1, before data is received, the buffer contents are, respectively, 0*, 0*, and 0*. At state 2, the buffer contents are 10, 0*, and 0*. At state 3, the buffer contents are 10, 11, and 0*. At state 4, the buffer contents are 10, 10, and 11. At state 5, the buffer contents are 11, 10, and 10. At state 6, the buffer contents are 10, 11, and 10. Subsequent states follow the 4, 5, and 6 pattern.

From FIG. 9 actual system display operation begins after two of the image buffers are full (T1 through T4 in FIG. 7). The circular queue is fully operational after 4 clock cycles, i.e., in "state 4." From this point on, stable operation proceeds through the repetitive sequence of states 4, 5, 6; 4, 5, 6; 4, 5, 6; . . . etc.

Although certain presently preferred embodiments of the invention have been described herein, it will be apparent to those persons having ordinary skill in the art to which the invention pertains that variations and modifications of the described embodiment may be made without departing from the spirit and scope of the invention. Accordingly, it is intended that the invention be limited only to the extent required by the appended claims and the applicable rules of law.

I claim:

1. An imaging system for producing a synthesized stereoscopic image from a single two-dimensional monocular source video signal, which signal includes a sequence of video images, comprising:

a) means for receiving the single two-dimensional monocular source video signal;

b) means for i) digitally converting the single two-dimensional monocular source video signal to a three-dimensional video image signal by a first analog-to-digital step of acquiring a sequence of the video images from the two-dimensional monocular source video signal, storing these video images in a digital buffer memory, and theraftor temporally displacing and horizontally offsetting the digital buffered video images, and for ii) then time-multiplexing the converted three-dimensional video images;

c) a single-screen video display receiving and displaying said time-multiplexed three-dimensional video image;

d) viewing glasses adapted for alternate left-eye, right-eye human viewing said video display by alternate shuttering; and e) means for controlling said alternate left-eye, right-eye shuttering of said viewing glasses.

2. The system of claim 1, wherein the monocular source video signal is a field interlaced video signal and wherein said digital converting and time-multiplexing means is adapted for said field interlaced display signal.

3. The system of claim 1, wherein the monocular source video signal is a non-interlaced video signal and wherein said digital converting and time-multiplexing means is adapted for said non-interlaced display signal.

4. The system of claim 1, further comprising a computer having memory, storage, and video input/output capabilities associated therewith; a program instruction set controlling two-dimensional—three-dimensional signal conversion in said computer.

5. The system of claim 1, wherein said viewing glasses are liquid crystal switching viewing glasses and said means for controlling is a switched infrared transmitter.

6. The system of claim 1, wherein the alternate left-eye, right-eye shuttering presents a sequence of left-eye and right-eye images, and wherein the left-eye and right-eye images are of substantially uniform brightness.

7. A method for synthesizing stereoscopic imaging of a single two-dimensional monocular source video signal, which signal includes a sequence of video images, comprising the steps of:

a) receiving the single two-dimensional monocular source video signal;

b) digitally converting the single two-dimensional monocular source video signal to a three-dimensional video image signal by acquiring a sequence of the video images from the two-dimensional monocular source video signal, analog-to-digital conversion of the video images and then storing these video images in a digital buffer memory, and thereafter temporally displacing and then horizontally offsetting the digital buffered video images and then time-multiplexing the converted three-dimensional video images;

c) displaying the time-multiplexed three-dimensional video images on a single-screen video display;

d) viewing said single-screen video display with viewing glasses adapted for alternate left-eye, right-eye human viewing; and e) controlling alternate left-eye, right-eye shuttering of said viewing glasses in synchronism with display of the three-dimensional video image.

8. The method of claim 7, wherein steps b) and c) further include the additional sequential steps of:

acquiring first frame F1, storing first frame F1 in a storage buffer;

copying frame F1 to a copy buffer;

acquiring second frame F2, storing second frame F2 in the storage buffer;

copying frame F2 to the copy buffer;

acquiring third frame F3, storing third frame F1 in the storage bufer, applying left and right spatial offsets to frames F1, F2 for display;

copying frame F3 to the copy buffer;

acquiring fourth frame F4, storing frame F4 in the storage buffer, applying left and right spatial offsets to frames F2, F3 for display;

copying frame F4 to the copy buffer;

acquiring fifth frame F5, storing fifth frame F5 in the storage buffer, applying left and right spatial offsets to frames F3, F4 for display;

copying frame F5 to the copy buffer; and acquiring fifth frame F5, storing fifth frame F5 in the storage buffer, applying left and right spatial offsets to frames F4, F5 for display.

9. The method of claim 7, wherein the steps of digitally converting and displaying are accomplished in substantially real-time.

10. The method of claim 7, wherein the two-dimensional monocular source video signal is a recorded signal, and the steps of digitally converting and displaying are accomplished from playing back the recorded two-dimensional monocular source video signal.

11. The method of claim 7, wherein the step of displaying is repeated on a plurality of additional single-screen video displays.

12. A mthod for synthesizing stereoscopic imaging of a single two-dimensional monocular source video signal, which signal includes a sequence of video images, comprising the steps of:

a) receiving the single two-dimensional monocular source video signal at a first location;

b) transmitting the single two-dimensional monocular source video signal to a second location remote from the first location;

c) receiving the transmitted single two-dimensional monocular source video signal at the second location;

d) digitally converting the received single monocular source video signal to a three-dimensional video image signal by acquiring a sequence of the video images from the two-dimensional monocular source video signal, analog-to-digital conversion of the video images and then storing these video images in a digital buffer memory, and therafter temporally displacing and horizontally offsetting the digital buffered video images and then time-multiplexing the converted three-dimensional video images;

e) displaying the time-multiplexed three-dimensional video images on at least one single-screen video display;

f) viewing said single-screen video display with viewing glasses adapted for alternate left-eye, right-eye human viewing; and g) controlling alternate left-eye, right-eye shuttering of said viewing glasses in synchronism with display of the three-dimensional video images.

13. A medical imaging system for producing a synthesized stereoscopic image from a single two-dimensional monocular source video signal, which signal includes a sequence of video images, comprising:

a) means for receiving the single two-dimensional source video signal;

b) means for i) digitally converting the single two-dimensional monocular source video signal to a three-dimensional video image signal by a first analog-to-digital step of acquiring a sequence of the video images from the two-dimensional monocular source video signal, storing these video images in a digital buffer memory, and thereafter temporally displacing and horizontally offsetting the digital buffered video images, and for ii) then time-multiplexing the converted video images;

c) a single-screen video display receiving and displaying said time-multiplexed signals;

d) viewing glasses adapted for alternate left-eye, right-eye human viewing said video display by alternate shuttering; and e) means for controlling alternate left-eye, right-eye shuttering of said viewing glasses.

14. The system of claim 13, wherein the monocular source video signal is a field interlaced video signal and wherein said digital converting and multiplexing means is adapted for said field interlaced display signal.

15. The system of claim 13, wherein the monocular source video signal is a non-interlaced video signal and wherein said digital converting and time-multiplexing means is adapted for said non-interlaced display signal.

16. The system of claim 13, wherein the digital converting means comprises a hybrid analog and digital two-dimensional—three-dimensional processor.

17. The system of claim 13, further comprising a computer having memory, storage, and video input/output capabilities associated therewith; a program instruction set controlling two-dimensional—three-dimensional signal conversion in said computer.

18. The system of claim 13, wherein said viewing glasses are liquid crystal switching viewing glasses and said means for controlling is a switched infrared transmitter.

19. The method of claim 13, wherein the alternate left-eye, right-eye shuttering presents a sequence of left-eye and right-eye images, and wherein the left-eye and right-eye images are of substantially uniform brightness.

20. A method for synthesizing medical stereoscopic imaging of a single two-dimensional monocular source video signal, which signal includes a sequence of video images, comprising the steps of:

a) receiving the single two-dimensional monocular source video signal;

b) digitally converting the single two-dimensional monocular source video signal to a three-dimensional video image signal by acquiring a sequence of the video images from the two-dimensional monocular source video signal, analog-to-digital conversion of the video images and then storing these video images in a digital buffer memory, and thereafter temporally displacing and horizontally offsetting the digital buffered video images and then time-multiplexing the converted three-dimensional video images;

c) displaying the time-multiplexed three-dimensional video images on a single-screen video display;

d) viewing said single-screen video display with viewing glasses adapted for alternate left-eye, right-eye human viewing; and e) controlling alternate left-eye, right-eye shuttering of said viewing glasses in synchronism with display of the three-dimensional video images.

21. The method of claim 20, wherein steps b) and c) further include the additional sequential steps of:

acquiring first frame F1, storing first frame F1 in a storage buffer;

copying frame F1 to a copy buffer;

acquiring second frame F2, storing second frame F2 in the storage buffer;

copying frame F2 to the copy buffer;

acquiring third frame F3, storing third frame F1 in the storage buffer, applying left and right spatial offsets to frames F1, F2 for display;

copying frame F3 to the copy buffer;

acquiring fourth frame F4, storing frame F4 in the storage buffer, applying left and right spatial offsets to frames F2, F3 for display;

copying frame F4 to the copy buffer;

acquiring fifth frame F5, storing fifth frame F5 in the storage buffer, applying left and right spatial offsets to frames F3, F4 for display;

copying frame F5 to the copy buffer; and acquiring fifth frame F5, storing fifth frame F5 in the storage buffer, applying left and right spatial offsets to frames F4, F5 for display.

22. The method of claim 20, wherein the steps of digitally converting and displaying are accomplished in substantially real-time.

23. The method of claim 20, wherein display is of a medical procedure, wherein the display is accomplished substantially simultaneously as the medical procedure is conducted.

24. The method of claim 20, wherein the two-dimensional monocular source video signal is a recorded signal, and the steps of displaying and digitally converting are accomplished from playing back the recorded two-dimensional monocular source video signal.

25. The method of claim 20, wherein the step of displaying is repeated on a plurality of additional single-screen video displays.

26. The method of claim 20, wherein the monocular source video signal is an output from an endoscope.

27. The method of claim 20, wherein the monocular source video signal is an output from a laparoscope.

28. A method for synthesizing stereoscopic imaging of a single two-dimensional monocular source video signal of a medical procedure, which signal includes a sequence of video images, comprising the steps of:

a) receiving the single two-dimensional monocular source video signal of the medical procedure;

b) transmitting the single two-dimensional monocular source video signal to a second location remote from the first location;

c) receiving the transmitted single two-dimensional monocular source video signal at the second location;

d) digitally converting the received single two-dimensional monocular video signal to a three-dimensional video image signal by acquiring a sequence of the video images from the two-dimensional monocular source video signal, analog-to-digital conversion of the video images and then storing these video images in a digital buffer memory, and thereafter temporally displacing and then horizontally offsetting the digital buffered video images and then time-multiplexing the converted three-dimensional video images;

e) displaying the time-multiplexed three-dimensional video images on at least one single-screen video display;

f) viewing said single-screen video display with viewing glasses adapted for alternate left-eye, right-eye human viewing; and g) controlling alternate left-eye, right-eye shuttering of said viewing glasses in synchronism with display of the three-dimensional video images.

* * * * *